US006437684B1

(12) United States Patent
Simeray

(10) Patent No.: US 6,437,684 B1
(45) Date of Patent: Aug. 20, 2002

(54) ELECTRONIC LOCKING DEVICE

(75) Inventor: Janick Simeray, Colombes (FR)

(73) Assignee: Electronic Key Systems (E.K.S.) Sarl, Luxembourg (LU)

( * ) Notice: Subject to any disclaimer, the term of this patent is extended or adjusted under 35 U.S.C. 154(b) by 0 days.

(21) Appl. No.: 09/202,397

(22) PCT Filed: Jun. 17, 1996

(86) PCT No.: PCT/FR97/01085

§ 371 (c)(1),
(2), (4) Date: Mar. 17, 1999

(87) PCT Pub. No.: WO97/48867

PCT Pub. Date: Dec. 24, 1997

(30) Foreign Application Priority Data

Jun. 17, 1996 (FR) ........................................... 96 07481

(51) Int. Cl.$^{7}$ ................................................ H04Q 1/00
(52) U.S. Cl. .................. 340/5.67; 455/343; 340/10.34; 340/5.25
(58) Field of Search ................................ 455/343, 127; 340/10.34, 5.67, 5.6, 5.65, 5.25

(56) References Cited

U.S. PATENT DOCUMENTS 4,829,296 A * 5/1989 Clark ........................ 340/5.65
4,912,460 A * 3/1990 Chu .......................... 340/5.67
4,980,680 A * 12/1990 Knoll ........................ 340/5.6
5,140,317 A * 8/1992 Hyatt ........................ 340/5.25

FOREIGN PATENT DOCUMENTS

| | | |
|---|---|---|
| JP | 5-37404 | * 2/1993 |
| JP | 6-73930 | * 3/1994 |
| JP | 6-73931 | * 3/1994 |
| WO | WO-80/02710 | * 12/1980 |

* cited by examiner

*Primary Examiner*—Brian Zimmerman
(74) *Attorney, Agent, or Firm*—Notaro & Michalos P.C.

(57) ABSTRACT

An electronic key comprising, mounted in a key body, a key shank for insertion into a corresponding housing of a lock cylinder for the purpose of unlocking it, the cylinder having a stator portion and a rotor portion secured to a tongue, and including first mechanical means and first electronic means, and the key including second mechanical means and second electronic means for co-operating with the corresponding first means of the cylinder when the key is fully inserted in the cylinder and for causing the lock to be unlocked when an identity code of the key and a corresponding code of the lock match. The electronic means of the key (16, 18, 20) are powered from self-contained power generator means (14) actuated merely by displacing the key shank in the body of the key.

21 Claims, 11 Drawing Sheets

ELECTRONIC LOCKING DEVICE

FIELD OF THE INVENTION

The present invention relates to the field of electromechanical or electronic keys and locks for preventing access to a given place or for preventing a determined apparatus from being put into operation, for example a rack or cabinet of electronics.

PRIOR ART

Over the last few years, locks have been developed that associate mechanical encoding, e.g. implemented in the form of notches, with electronic encoding transmitted between the key and the lock. Patent application EP 0 277 432 shows an example of such an electromechanical lock in which the key comprises not only mechanical encoding for unlocking the lock, but also an electronic circuit which acts, on insertion of the key, to transmit a preprogrammed identity code to the lock. The key is powered from the lock which is itself powered from an external source. Similarly, application FR 2 561 292 discloses an electronic key capable of being used with an electromechanical lock and having both notches for mechanical encoding and an electronic microprocessor circuit powered by electricity taken from a rechargeable battery placed directly in the key.

Nevertheless, both the above locks suffer from a major defect that results from the fact that the type of cylinder used is particularly complex to make and is thus very expensive. In that type of lock, it is the difficulty of copying the mechanical profile of the cylinder which guarantees maximum security and not the additional electronic encoding. As a result, if the key is lost, then it is necessary to replace the cylinder whether or not it is associated with an electronic circuit.

Also, in application EP 0 388 997, its Proprietor proposes a lock which is an entirely electronic lock and which is unlocked solely by a match between the identity codes of the key and of the lock.

That type of electronically-locked lock nevertheless also suffers from certain drawbacks, in particular with respect to its power supply which is generally obtained from an external source or from a rechargeable battery. Unfortunately, such an external source is not always available, and using a battery placed inside the lock, in the key, or in both of them simultaneously, suffers from serious difficulties of recharging and of reliability in operation.

OBJECT AND DEFINITION OF THE INVENTION

An of the present invention is to mitigate the above-specified drawbacks by proposing an electronic lock and key assembly that is entirely self-contained, requiring no independent power supply, whether external or in the form of one or more batteries that can be recharged by means of an external device. Another object of the invention is to provide a lock cylinder and a key each of which is relatively simple to make and low in cost, and which guarantee that the system is completely secure.

These objects are achieved by an electronic key comprising, mounted in a key body, a key shank for insertion into a corresponding housing of a lock cylinder for the purpose of unlocking it, the cylinder having a stator portion and a rotor portion secured to a tongue, and including first mechanical means and first electronic means, and the key including second mechanical means and second electronic means for co-operating with the corresponding first means of the cylinder when the key is fully inserted in the cylinder and for causing the lock to be unlocked when an identity code of the key and a corresponding code of the lock match, the key being characterized in that the electronic means of the key are powered from self-contained power generator means actuated merely by displacing the key shank in the body of the key.

By means of this particular structure, the electronic means of the key for interchanging and verifying identity codes and possibly also for controlling unlocking of the lock can be powered by a single module actuated solely by moving the shank of the key and independently of any external power supply device.

In a preferred embodiment, the said power generator means is connected via a power link to a rectifier and storage means which generates a DC power supply voltage from AC signals delivered by the power generator means, said rectifier and storage means itself being connected to processor means which, via a communications link connecting it to the power generator means, serves to interchange the data required for unlocking the cylinder.

Advantageously, the power link and the communications link constitute a single link at the power generator means, and the second electronic means then include multiplexer/demultiplexer means for connecting the power generator means both to the rectifier and storage means and to the processor means.

Preferably, the second electronic means further include communications interface means disposed between the processor means and the power generator means for matching and filtering the signals delivered at the output of the processor means.

In a first preferred variant, the rectifier and storage means is also connected to the power generator means so as also to power the cylinder of the lock when the key is inserted in the lock. In this way, the cylinder can operate in self-contained manner without relying on any internal power supply (battery or mains, for example).

In a first example, the power generator means include at least one piezoelectric element designed to generate electric charge from successive bending movements generated by the displacement of the shank of the key. Advantageously, the piezoelectric element is constituted by a single piezoelectric plate embedded at one of its two ends in the body of the key and which can either have a serrated profile designed to co-operate with at least one contact tip of a piezoelectric element of the cylinder while the key is being inserted into the cylinder, or else the end of said piezoelectric plate that is left free has a contact tip and is designed to co-operate with a serrated profile of the key shank during extraction/retraction of the shank out from or into the body of the key.

The key shank may also have an additional piezoelectric element connected to the processor means and designed to interchange data between the key and the cylinder of the lock after the key shank has been inserted in the cylinder.

The key shank may further include at least one contact area connected to the processor means and designed to interchange data between the key and the cylinder of the lock after the key shank has been inserted in the cylinder. Advantageously, the contact area is also connected to the output of the rectifier and storage means to enable the cylinder to be powered from the lock after the key shank has been inserted in the cylinder.

In a particular embodiment of the key, said key shank may be of cruciform shape.

In a second preferred variant, the power generator means comprise firstly a magnetized shank constituting a magnetic core, and secondly a plurality of coils connected in a ring, and separated by walls of material having high magnetic permeability, and contained in a body which is itself made of a material having high magnetic permeability and forming a sheath for said magnetized shank, an ejection system, e.g. using a spring being provided to extract/retract said shank from and into its sheath.

Advantageously, the magnetized shank has a plurality of bipolar annular magnets that are regularly separated by walls of material having high magnetic permeability, the distances between said walls being determined in such a manner as to correspond exactly firstly with the differences between the corresponding walls of the sheath-forming body of the key, and secondly with the walls of said tube of the cylinder.

The bipolar annular magnets have polarities that are determined in such a manner that two adjacent magnets repel each other, with the north/south axes of the magnets being parallel to the longitudinal axis of the shank.

The magnetized shank further includes a wall of material having high magnetic permeability, such as soft iron, and for the purpose, on said wall coming into contact with an external magnetic separation wall of the sheath-forming body of the key, of closing the magnetic circuit when the key is fully inserted into the cylinder.

Preferably, there are four of said coils, with the winding directions of two adjacent coils of said four coils being opposite to the winding direction of the other two coils. The four coils have two distinct electrical contact terminals via which there are respectively provided the power link for powering the second electronic means of the key, and the communications link for interchanging data with the cylinder of the lock.

The invention also provides a lock designed to receive the above-described electronic key and in which the cylinder has at least one power generator means that is actuated during or at the end of insertion of the key so as to power the first electronic means of the cylinder.

In a first advantageous variant, the power generator means also serve to provide coupling between the key and the cylinder of the lock, to enable data, in particular identity codes, to be interchanged between the cylinder and the key after the shank of the key has been inserted in the cylinder.

In a second advantageous variant, the power generator means also makes it possible to cause an element for blocking the tongue to be displaced so as to unlock the lock.

The power generator means is connected via a power link to rectifier and storage means which generate a DC power supply voltage from alternating signals delivered by the power generator means, said rectifier and storage means itself being connected to processor means which, via a communications link connecting it to the power generator means, serves to interchange data required for unlocking the cylinder of the lock, said processor means also serving to drive control means which deliver a control pulse to the power generator means via the communications link, said pulse being of determined duration that is sufficient to release the element for blocking the tongue, thereby unlocking the lock.

Preferably, the first electronic means of the cylinder further include switching means enabling the power generator means to be connected via its communications link both to the processor means and to the control means.

In a first preferred variant, the power generator means of the cylinder comprise at least one piezoelectric element having electrical contact terminals with successive bending movements thereof during insertion of the key generating electric charge at the contact terminals thereof.

The piezoelectric element may be constituted by a single piezoelectric plate embedded at one of its two ends in the rotor portion of the cylinder or by a bimorph whose central portion is embedded in the rotor portion of the cylinder. Each free end of the piezoelectric element has at least one contact tip designed to co-operate with the shank of the key and at least one blocking element designed, in a rest position, to prevent any rotation of the tongue relative to the stator portion of the cylinder.

In a second preferred variant, the power generator means of the cylinder is mounted around the housing, at the inlet to the cylinder, and comprises a tube of high magnetic permeability material, such as soft iron, containing a plurality of coils connected in a ring and separated by regularly spaced walls of material having high magnetic permeability, said coils being designed to co-operate firstly with a magnetized shank forming a magnetic core and carried by the key, and secondly with a key-expelling piston suitable for sliding in the housing and provided with said elements for blocking the tongue.

Preferably, there are four of said coils, with the winding direction of two adjacent coils in said four coils being opposite to the winding direction of the other two coils, and the four coils have two distinct electrical contact terminals via which there are provided respectively a power link for powering the first electronic means, and a communications link for interchanging data and for actuating the blocking element.

In an advantageous example, the tongue comprises firstly a cylindrical body and secondly a fin extending radially from said body, the body having an opening for receiving two hollow annular pieces made of a material of high magnetic permeability and placed one against the other while leaving between them an empty disk-shaped space, the inside dimensions of said pieces corresponding to the outside dimensions of the housing, and each inside wall of the annular pieces in contact with said empty space includes a blocking slot designed to receive said blocking element. The fin includes centering means, e.g. formed by a ball-and-spring assembly, designed to cooperate with corresponding means of the stator portion of the cylinder, e.g. with cavities for receiving the balls.

The key-expelling piston has a central core of material having high magnetic permeability, and at each of the two ends of which there is mounted, about a respective axis, said blocking element formed by a slightly magnetized rotary blade, said blocking blade being pivotable to come into one of said locking slots of the tongue when the power generator means is actuated. The central core is covered in a non-magnetic material and terminated at both ends by respective mechanical interface elements designed to co-operate with the mechanical interface means of the key to transmit the rotary couple.

The present invention also relates to a locking system provided with an electronic key and an associated lock.

BRIEF DESCRIPTION OF THE DRAWINGS

Other characteristics and advantages of the present invention appear more clearly from the following description given by way of non-limiting indication, and with reference to the accompanying drawings, in which.

DETAILED DESCRIPTION OF PREFERRED EMBODIMENTS OF THE INVENTION

The present invention relates to an electronic key, to an electronic lock, and to the combination of the key and the lock, referred to in the present application as an electronic locking system. In conventional manner, the lock has a cylinder provided with a housing for receiving the key and with mechanical and electronic elements for unlocking the lock when the key is inserted into the housing, and when an identity code of the key matches a corresponding identity code of the lock.

Figure 1:
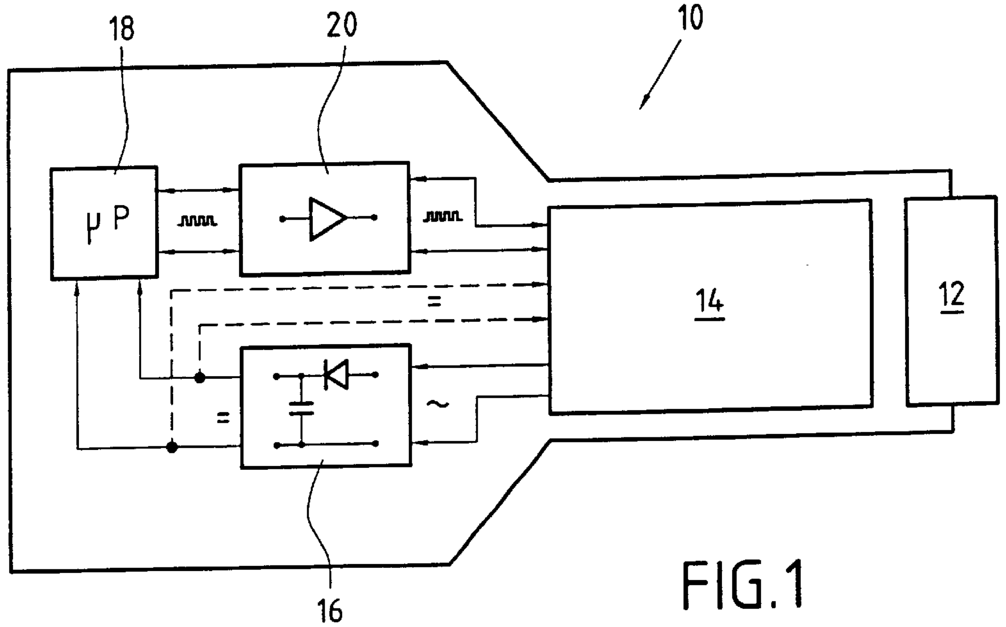
FIG. 1 is a diagrammatic view of an electronic key used in an electronic locking system of the invention.

Reference is made initially to FIG. 1 which is a highly diagrammatic representation of the key 10 conventionally comprising a shank-forming first end of shape and dimensions that fit the housing in the cylinder of a lock whose bolt (not shown) is to be actuated, and a second end constituting the body of the key and forming a head which, on being rotated, serves to actuate a tongue of the cylinder and thus to drive the bolt of the lock (via conventional mechanical lock means, not shown).

The key has a second mechanical interface means 12 for transmitting the rotary couple from the key to the lock and making it possible, once the key has been coupled with the lock, for the bolt to be actuated when conditions for enabling the lock to be opened are complied with (matching identity codes of the key and of the lock, respectively). It also includes first power generator means 14 for operating, in a communications link and in a power link both to convey data between the key and the lock and to power the key and possibly also the cylinder of the lock. First rectification and energy storage means 16 connected to the power generator means (via the power link) are also provided to receive and accumulate energy from said power generator means, e.g. when the key is inserted in the lock. The rectification and energy storage means is connected to first processor means 18, advantageously having a microprocessor and a memory, which it serves to power, and which in turn manages (in particular by comparing the identity codes of the key and of the lock) and controls transfer of data corresponding to the identity codes. The interchange of this encoded data is optionally performed via first communications interface means 20 (which if necessary matches and filters the signals from the processor means) connected firstly to the processor means 18 and secondly to the power generator means 14 (via the communications link) through which the interchange takes place. When the cylinder has no power supply means, an additional output link from the rectifier and storage means 16 serves to deliver energy stored from the power generator means 14 to power the cylinder.

Figure 2:
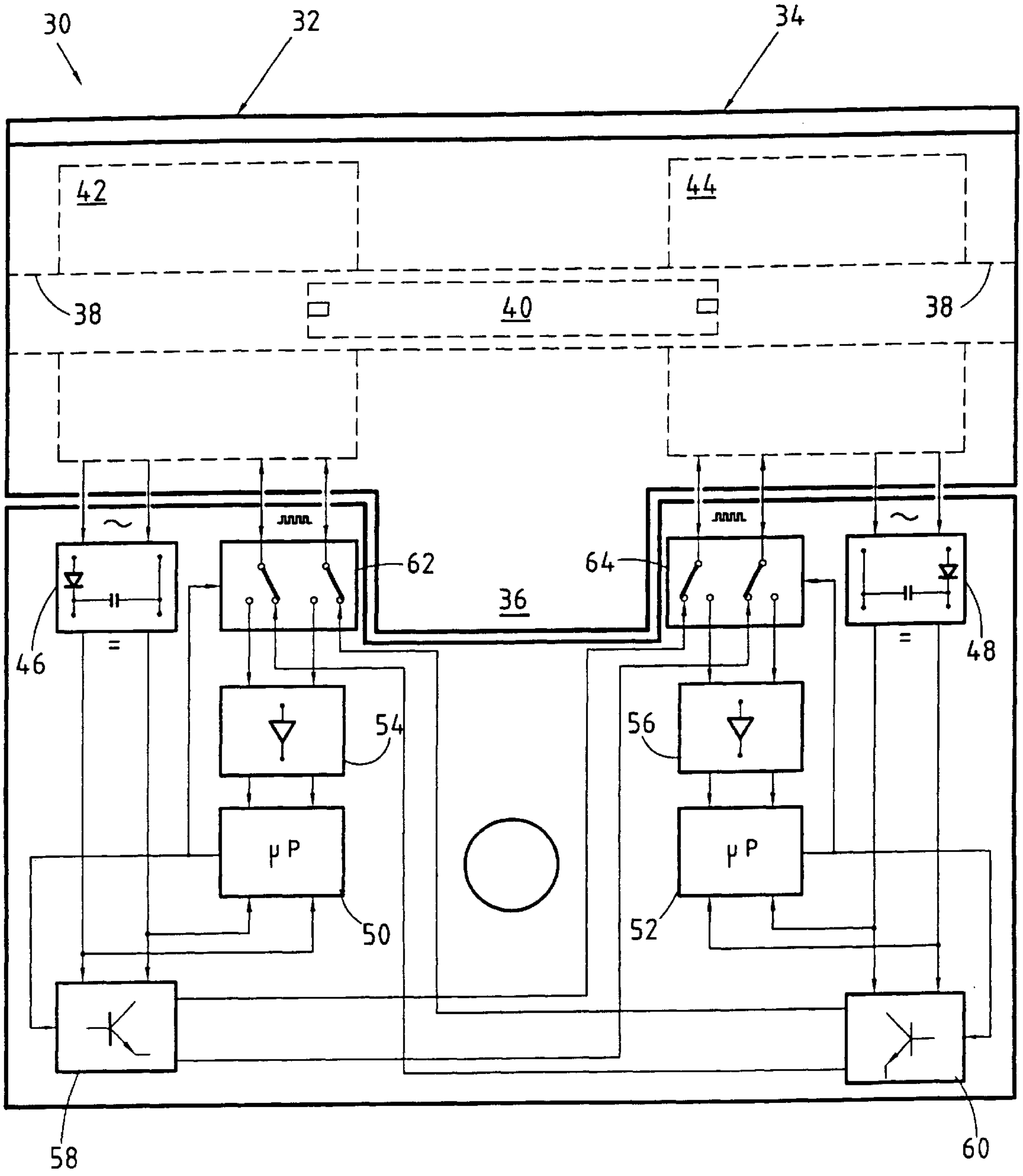
FIG. 2 is a diagrammatic view of a dual cylinder of a lock used in the electronic locking system of the invention.

FIG. 2 is a highly diagrammatic longitudinal section through a first embodiment of a cylinder 30 of symmetrical European profile having two inlets (two cylinders) of outside shape and size analogous to those of conventional mechanical dual cylinder locks, thereby greatly facilitating replacement, and provided with self-contained power generator means specifically adapted to co-operate with a key of the above-specified type, itself provided with its own power generator means. This dual cylinder lock conventionally has an upstream portion 32, a downstream portion 34, and an intermediate rotary portion or tongue 36 which can be rotated by the key by means of the mechanical second interface means 12 when the key is inserted into either of the two housings 38 of the two cylinders, and providing the identity codes match. The cylinder has moving shutter means 40 constituting a key-expelling piston for preventing any external action being taken on the tongue 36 and for cooperating with the mechanical second interface means 12 to rotate the tongue. It also has second and third power generator means 42, 44 that are identical and that are associated respectively with the upstream portion 32 and with the downstream portion 34 of the dual cylinder lock and which serve not only to supply power to the lock (via a power link) but also firstly to perform a communications function between the key and the lock (via a communications link), and secondly a function of unlocking the lock (by releasing its tongue) via the communications link. Like for the key, each of the two power generator means is connected via the power link to a respective second (or a third) rectifier and energy storage means 46 (or 48) for rectifying and accumulating energy generated by the means 42, 44 when a key is inserted in the lock. The second and third rectifier and energy storage means are connected to power respective second and third processor means 50 and 52, each advantageously constituted by a microprocessor and memory, and each of which manages and controls the transfer of data corresponding to the identity codes of the key and of the lock. This transfer of encoded data (between the key and the lock) is optionally performed (when it is necessary for the processor means to perform signal matching and filtering) via respective second and third communications interface means 54 and 56 connected firstly to the second or third power generator means (via its communications link) and secondly to the second or third processor means. Finally, first and second control means 58 and 60 (e.g. of the transistor switch type) are provided for controlling release of the lock under instructions respectively from the second and third processor means 50 and 52, by causing the energy accumulated in the second or third rectifier and energy storage means 46 or 48 to be discharged as a pulse over the communications link of the third or second power generator means 44 or 42. Preferably, when the cylinder is of the dual cylinder structure as shown, the energy accumulated in the rectifier and storage means of a determined portion of the cylinder (e.g. the upstream portion) is discharged into the power generator means of the other portion of the cylinder (in this case the downstream portion), and vice versa. Since the energy is discharged via the communications link, it is preferable to provide switching means 62, 64 (e.g. a discriminating filter) controlled by the processor means 50, 52 for directing the communications output from the power generator means either to the communications interface means 54, 56 or else to the control means 58, 60.

Figure 3:
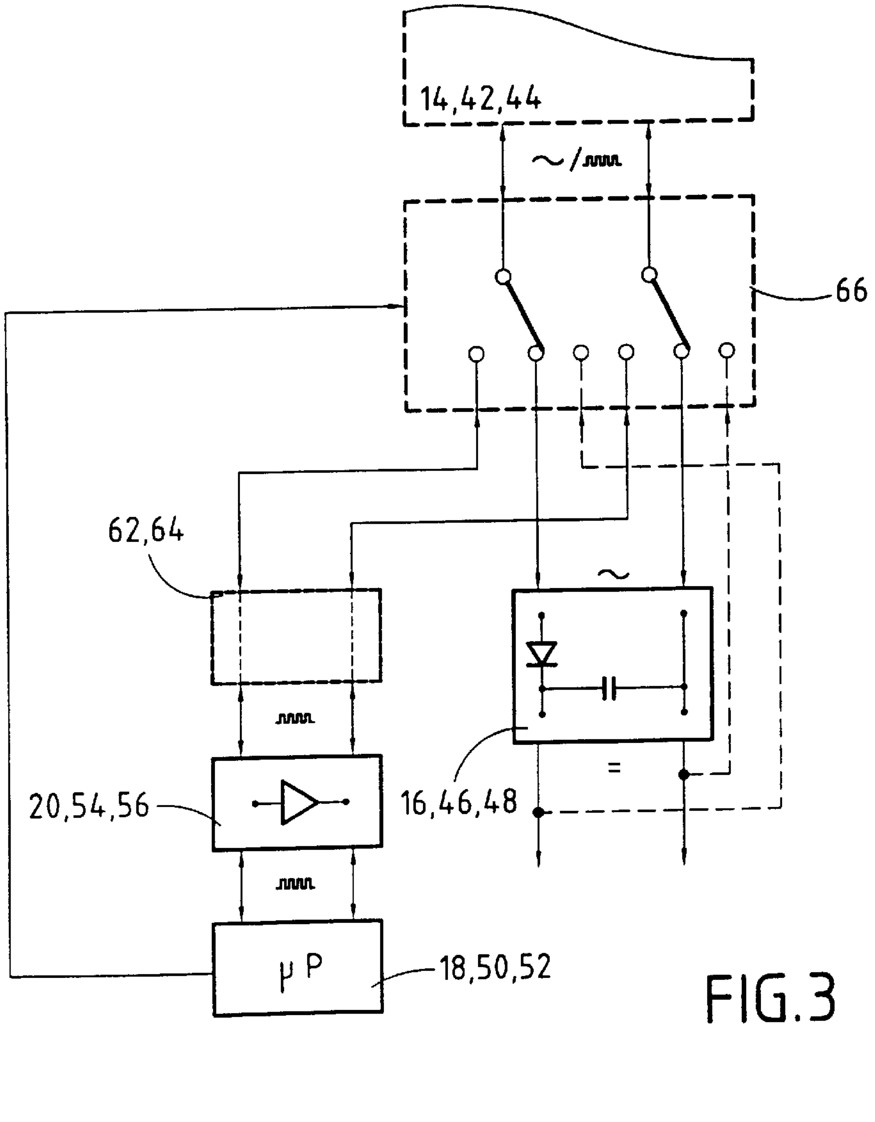
FIG. 3 shows a variant embodiment of the electronic means of FIGS. 1 and 2.

When the communications link and the power link comprise a single link in the key as in the lock, i.e. when data is transmitted over the power supply line, it is necessary also to provide multiplexer/demultiplexer means 66 (FIG. 3) to direct said single link either to the rectifier and energy storage means 16; 46, 48 or else to the communications interface means 20; 54, 56, and vice versa (possibly via the switch means 62, 64). Naturally, when the lock is powered from the key, the multiplexer/demultiplexer means 66 is also connected to the output of the rectifier and storage means to make such return power supply possible.

It can be observed that although second and third processor means are described, there is clearly nothing to prevent making use of single processor means only (see for example the circuit 51 in FIG. 12) which can indeed be preferable for reasons of minimizing bulk. Similarly, although the present invention is illustrated essentially by means of a dual cylinder structure, it is entirely possible to envisage implementing the invention with a single cylinder type structure having a knob of international profile, for example, or any other analogous mechanical structure. Similarly, it may also be observed that the disposition within the cylinder body of the various electronic means specified above is not exclusive and it is entirely possible, and even preferable, to envisage grouping all of the electronic means together in the tongue (as shown for example in FIGS. 12 and 14). The same applies to the disposition of the power generator means which may be different (see in particular FIGS. 16 and 17 for a disposition which instead of being upstream/downstream is on one side and on the other of the longitudinal axis of the cylinder).

Figure 4:
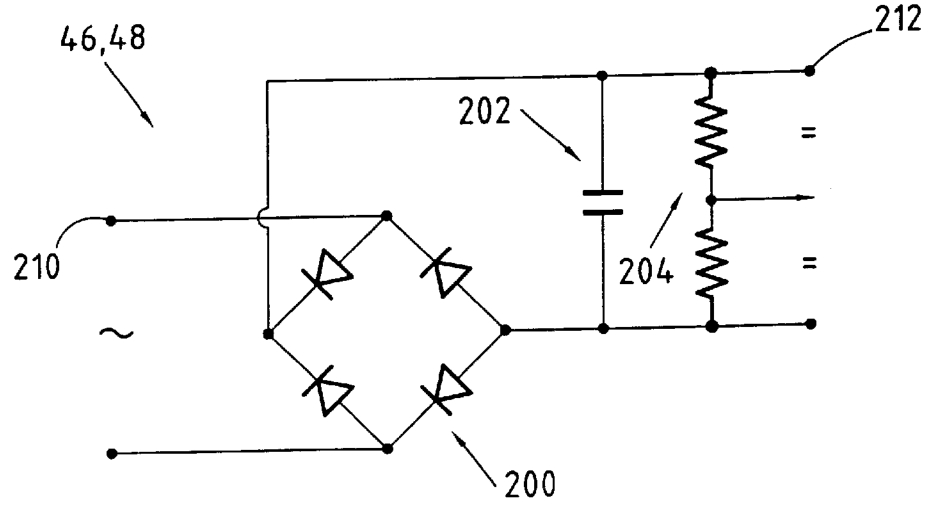
FIGS. 4 and 5 show two examples of the rectifier and storage means of the means of FIGS. 1 and 2.
Figure 5:
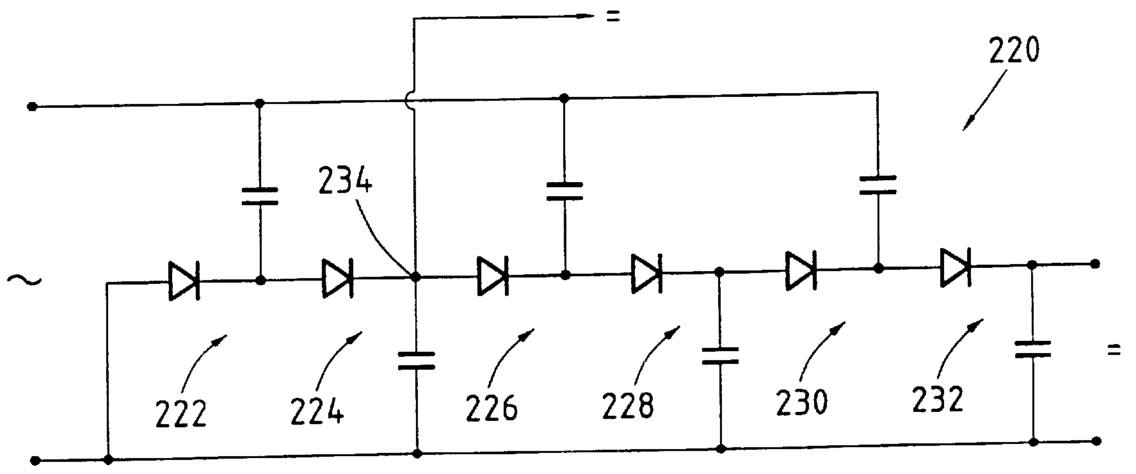

FIGS. 4 and 5 show two embodiments of the rectifier and energy storage means 16; 46, 48 associated with each power generator means of the key or of the cylinder 14; 42, 44. In FIG. 4, it can be seen that the means 16; 46, 48 can be constituted merely by a diode bridge 200 followed by a filter and energy storage element such as a capacitor 202. On an input 210, the bridge receives an AC voltage from the power generator means 14; 42, 44, and on an output 212 it generates a DC output voltage intended firstly, for example, for releasing the tongue (in the case of the power generator means 42, 44 of the cylinder) or for powering the cylinder from the key (in the case of the corresponding means 14 of the key) and, secondly, via a voltage divider 204, for powering the processor means 18; 50, 52. Another possible solution for implementing the rectifier and storage means is to make use of a diode voltage multiplier 220 (FIG. 5). The voltage multiplier conventionally comprises a plurality of rectifier and voltage raising stages, e.g. six stages 222 to 232, each constituted by a diode and a capacitor. With this structure, the processor means 18; 50, 52 is powered directly from the output 234 of one of the stages of the multiplier, e.g. the second stage 224, which has a voltage that corresponds to the desired power supply voltage for the processor means, with the other, intermediate outputs of the multiplier serving to deliver various DC voltages, e.g. in the key, for powering the cylinder (by analogy with FIG. 1).

Figures 6A, 6B, 6C, 6D, 6E, 7A, 7B, 7C:
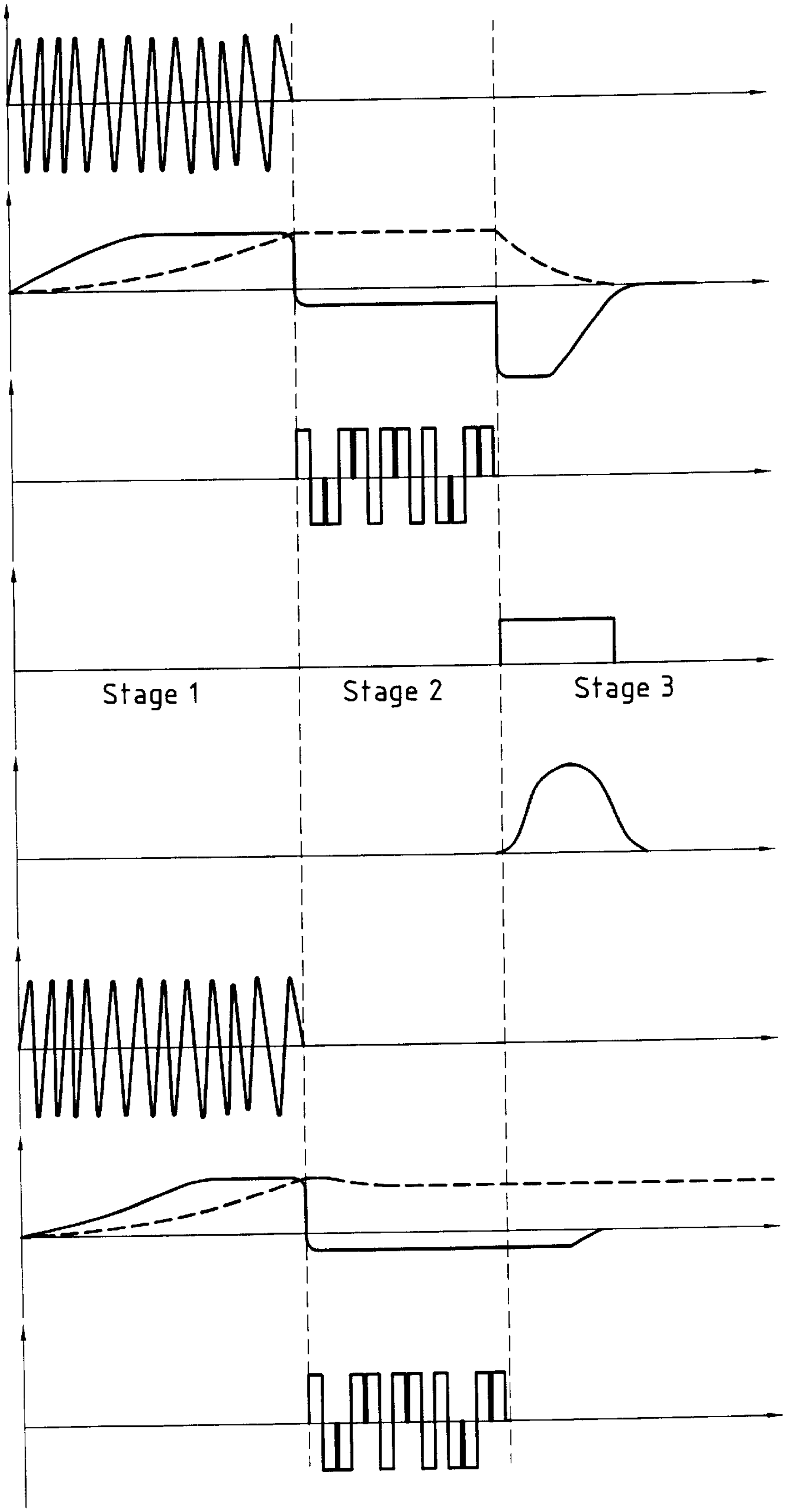
FIGS. 6*a* to 6*e* and 7*a* to 7*c* show the various signals available in the electronic means respectively of the cylinder and of the key shown in FIGS. 1 and 2.

FIGS. 6 and 7 are histograms showing the electrical signals available at the outputs of the various electronic means described above for the particular case of the power for the key and for the lock being generated by the key being inserted into the cylinder of the lock. FIG. 6*a* shows the output current from the power generator means 42, 44 of the lock, after the key 10 has been inserted into the cylinder 30. FIG. 6*b* shows the current output by the rectifier and storage means 46, 48 (the dashed line curve showing the charge voltage). FIG. 6*c* shows the interchange of codes between the lock and the key at the output from the communications interface means 54, 56. FIG. 6*d* shows the control signal generated at the output of the processor means 50, 52 for enabling the tongue to be released by discharging the energy which was accumulated in the storage means 46, 48 on insertion of the key into the coupling means 42, 44 (see in FIG. 6*e* the output signal from the control means 58, 60). Similarly, FIG. 7*a* shows the current output by the power generator means 14 of the key. FIG. 7*b* shows the current output by the rectifier and storage means 16 (the dashed line curve showing the charge voltage), and FIG. 7*c* shows codes being interchanged between the lock and the key at the output from the communications interface means 20.

On examining these histograms, it can be seen that the operations performed by the various electronic means take place in three successive stages. Firstly AC is generated in parallel in the lock and in the key, which AC is rectified to deliver power supply voltages to the respective processor means of the lock and of the key (first stage), which means are then activated. They can then proceed to interchange identity codes and compare them (second stage). After this interchange, and assuming that the codes match, the lock can be opened by discharging the energy accumulated in the storage means so as to release the tongue, and thus the cylinder, as explained in greater detail below.

It will be observed that when the lock is powered from the key, the structure of the electronic means of the cylinder can be simplified by omitting the rectifier means 46, 48, with the output voltage from the power generator means of the lock being delivered directly in the form of a DC voltage (but it is also possible to add a DC/AC converter in the key without altering the structure of the cylinder).

Figure 8:
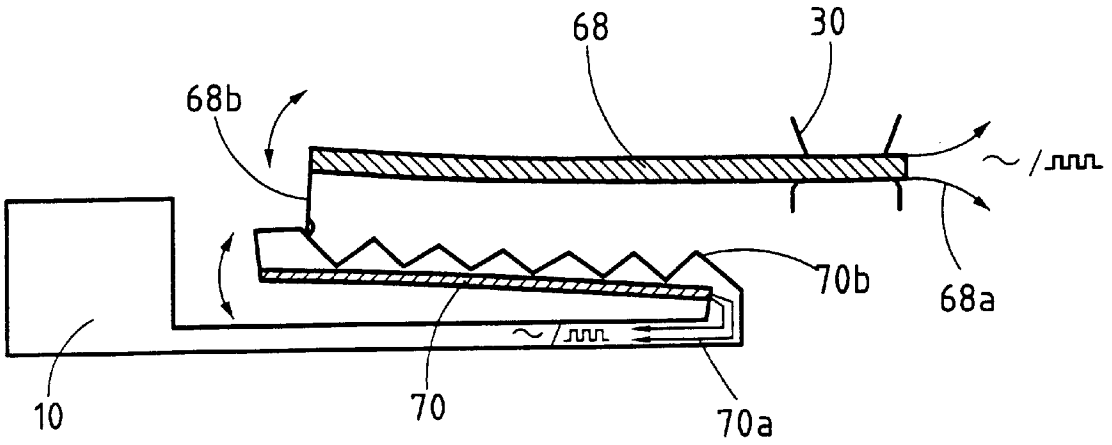
FIG. 8 is a functional diagram of a first example of power generator means for the locking system.

FIG. 8 shows in highly diagrammatic and functional manner a first embodiment of the power generator means of the lock and of the key in the form of piezoelectric elements.

The power generator means of the lock 42 or 44 is constituted essentially by a piezoelectric element such as a piezoelectric plate 68 provided with electrical contacts 68*a* to provide the communications and power links, the plate being embedded at one of its two ends in the body of the cylinder 30, and having at its free, other end a contact tip **68*b* that is subjected to pivoting and that is designed to co-operate with a particular serrated profile 70*b*** of the key.

The power generator means 14 of the key likewise comprise a piezoelectric plate 70 provided with electrical contacts **70*a*, embedded at one of its ends in the body of the key 10, and supporting the serrated profile 70*b*, with its other end being free to move back and forth under pressure from the contact tip 68*a***.

Piezoelectric plates are components known to the person skilled in the art and therefore do not need describing in detail. It is merely observed that the plates which are multilayer composite structures of piezoactive ceramic provide bending movement of sufficient amplitude to make self-contained power generation possible (i.e. without any need for an additional power supply source such as a rechargeable battery, even though using such an external source is naturally not to be excluded, particularly when the key has sophisticated programming functions), and naturally capable of powering the processor means of the lock and also of the key (which means require little energy), but also and above all capable of powering the control means that enable the lock to be released. A plate of small dimensions (40 mm×10 mm×1 mm) can bend through an amplitude of ±0.5 mm under the effect of stress and thus allow a non-negligible quantity of energy to be accumulated. Under such circumstances, it will readily be understood that subjecting the plate to a plurality of deformations (in practice the number of deformations can lie in the range 10 to 40) makes it possible to obtain sufficient energy to power all of the components of the key and to release the lock without there being any need for an additional power supply. The piezoelectric energy constituted by the alternating and cyclic flow of charge that results from such successive deformations and that is available at the electrical contact terminals of the key and of the lock **68*a*, 70*a*, is then transferred and accumulated in the respective rectifier and storage means 16; 46, 48 to enable the system of the invention to be powered. Conversely, given the reversibility of such a piezoelectric plate, discharging sufficient energy across its contact terminals 68*a*, 70*a*** will cause it to move, and that can be used for actuating release of the tongue.

However, such piezoelectric plates can also be used as communications means for interchanging data between the lock and the key. When the key 10 is fully inserted in the cylinder 30, the piezoelectric plate 70 of the key and the piezoelectric plate 68 of the lock are both subjected to bending and are therefore mechanically coupled together. Such a structure then forms a coupled oscillator which has its own resonant frequency that can be used as a communications carrier frequency. This frequency is stored, e.g. in the processor means of the lock, which means can give the signal for starting data interchange in the form of a short period of excitation of said oscillator at said frequency, and the key can then give this reference the logic value 0. Logic value 1 can be communicated from the key to the lock or vice versa under such circumstances in conventional manner merely by changing the phase or the frequency of the reference signal, and naturally by doing so for a length of time that is sufficient to enable the change to be detected. The communications bandwidth corresponds to that of the mechanical coupling.

Figure 9:
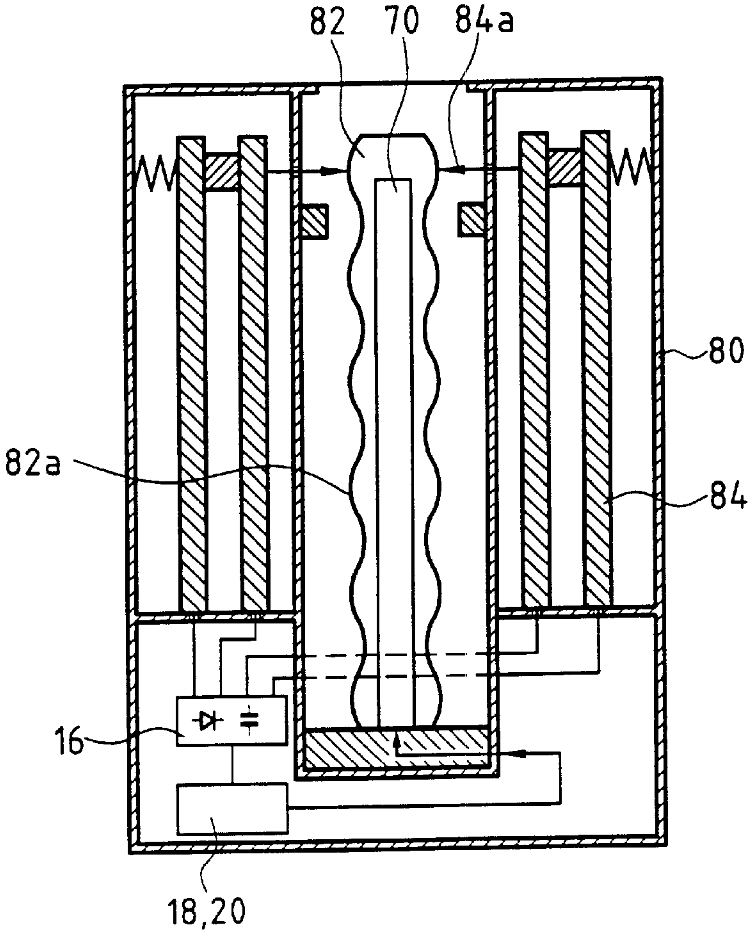
FIG. 9 shows a first embodiment of an electronic key having a piezoelectric module whose shank is in a retracted first position.
Figure 11:
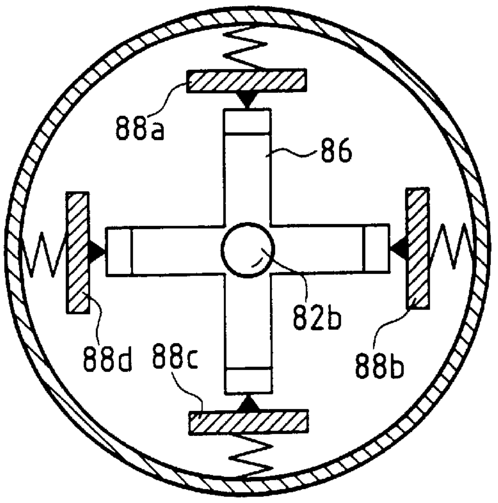
FIG. 11 is a cross-section through an embodiment of the shank of the electronic key.

A preferred embodiment of an electronic key of the invention is shown in FIG. 9. This key is in the form of a box (the key body 80) containing a shank 82 that can be extracted by any known means, whether manual (e.g. a serrated button) or automatic, and designed to be inserted in the housing 38 of the lock. The shank shown in a retracted position has an external serrated profile **82*a* for co-operating at least with one contact tip 84*a* of at least one piezoelectric element (the plate 84) having one end embedded in the box 80 and having its opposite end free and movable under displacement of the contact tip 84*a*. In the example shown, the extractable shank 82 has a symmetrical serrated profile on two opposite faces and there are four piezoelectric elements, with each contact tip 84 serving to actuate two elements simultaneously. Naturally, this configuration is given purely by way of illustration and depends essentially on the amount of electrical energy that needs to be produced. By way of example, FIG. 11 shows a shank 86 of cruciform section that excites four piezoelectric elements 88*a*, 88*b*, 88*c*, and 88*d*. Naturally, the key also includes a circuit for converting the electric charge generated by the piezoelectric elements (the rectifier and storage circuit 16 may include a capacitor of large capacitance, or a storage or rechargeable battery) and a microcontroller or microprocessor type controlling integrated circuit 18 that is powered directly by the circuit 16 to which it is connected. The processor circuit 18, which may include the communications interface circuit 20, is connected to the piezoelectric element 70 mounted on the shank 82 and designed to cooperate with a corresponding piezoelectric element of the lock (element referenced 68 in FIG. 8**) for the purpose of interchanging identity codes.

Figure 10:
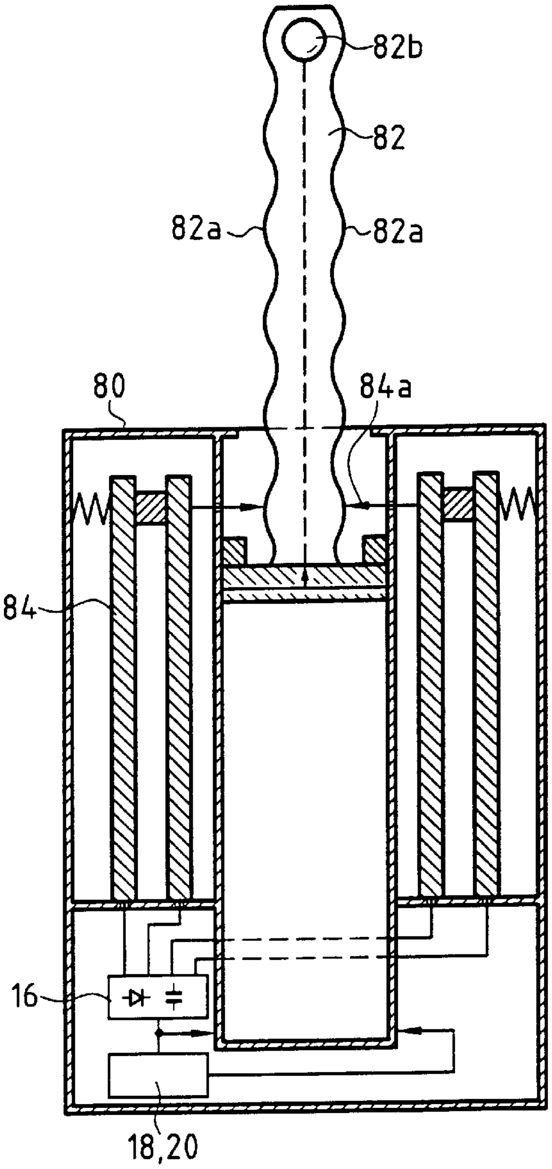
FIG. 10 shows a second embodiment of an electronic key having a piezoelectric module whose shank in a second position.

FIG. 10 shows a variant embodiment of the key of FIG. 9 in which the shank 82 is shown in its deployed or "second" position. In this variant, the communications link for interchanging codes takes place via at least one contact area **82*b* of the shank 82 (advantageously one area per face so that the key can be inserted either way round) which area is also used for transferring the power required for the lock and taken from the output of the rectifier and storage circuit 16 (such a contact area is also present in the variant of FIG. 11). The other elements of the key are identical to those mentioned above with reference to FIG. 9** and are not described again.

It is important to observe that the various embodiments shown are not limiting in any way and that, for example, it is possible for the shank of the key 82 to have not only at least one contact area **82*b* for powering the lock from the key, but also a piezoelectric element for interchanging data. In these embodiments, it will also be observed that power generation in the key now comes from the shank being extracted from its box (or being retracted into the box), whether manually or automatically (as opposed to by the shank being inserted into the lock), thereby exciting the piezoelectric element 84 of the key and causing energy to be accumulated in the corresponding storage means 16. Thereafter this energy is used for powering the processor means 18, 20** managing communications between the key and the lock, and in a variant for transferring sufficient energy to the lock to enable it to be powered.

Figure 12:
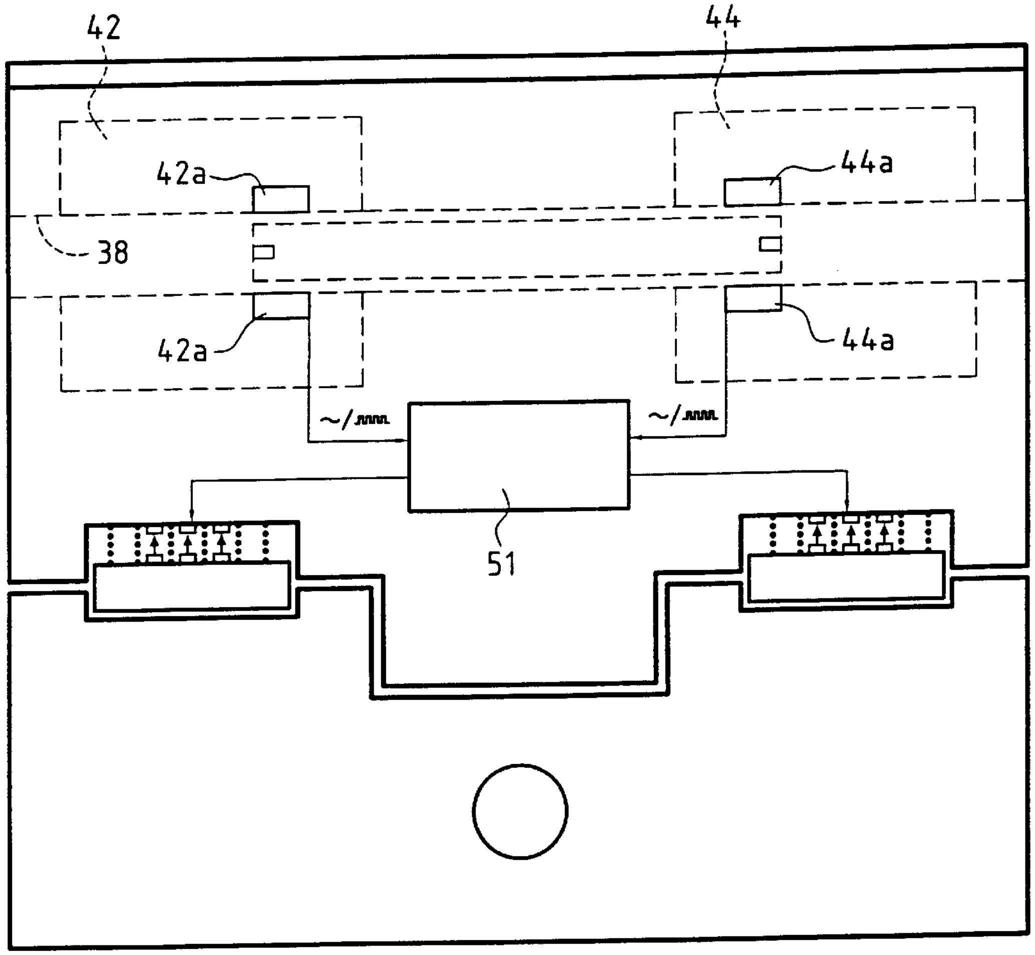
FIG. 12 shows an embodiment of a lock cylinder suitable for co-operating with the electronic key of FIG. 10.

FIG. 12 shows in highly diagrammatic manner a lock cylinder intended more particularly for receiving an electronic key of the kind described above with reference to FIG. 10. In this cylinder configuration, the power generator means 42, 44 can be no more than contact areas **42*a* and 44*a* designed to co-operate with the contact area 82*c* of the key and via which there passes not only the energy required for powering the lock, but also the data required for checking the identity codes. The electronic processor circuit 51**, which advantageously comprises a microprocessor and a memory, serves to manage these codes and, if they match, to release the control means which in turn release the cylinder.

Figure 13:
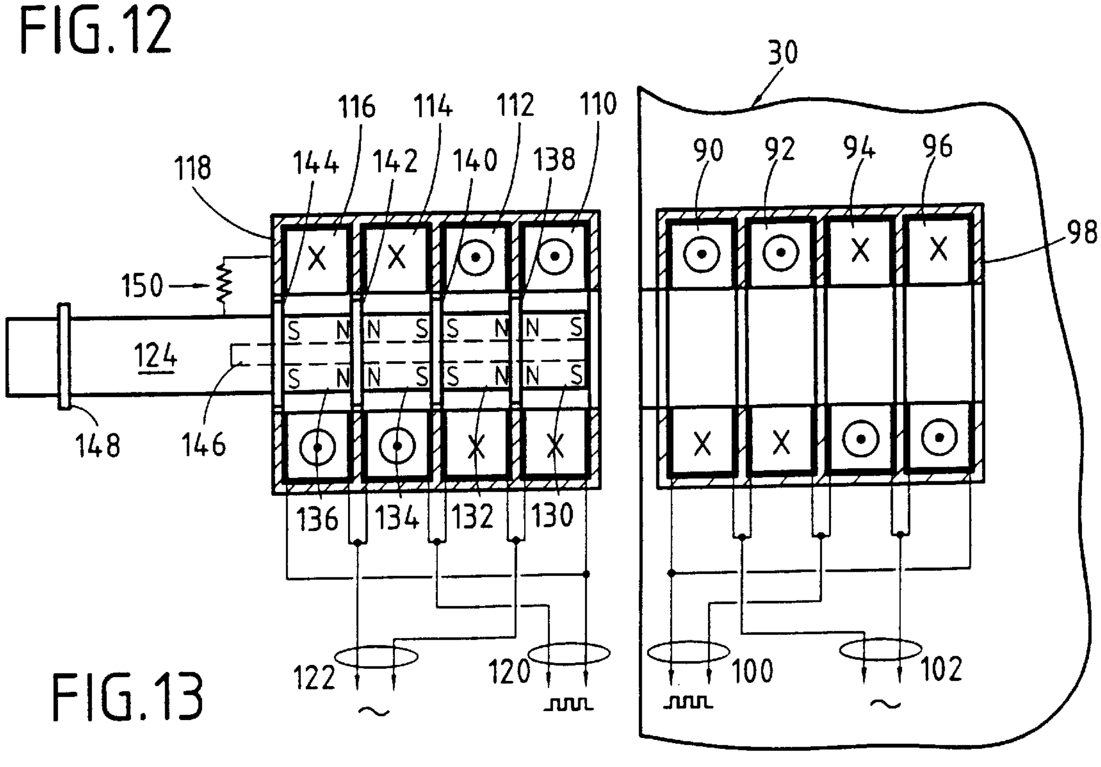
FIG. 13 is a functional diagram of a second example of power generator means for the locking system of the invention.

FIG. 13 shows in highly diagrammatic and functional manner a second embodiment of the power generator means of the lock and of the key in the form of magnetic elements.

In this embodiment, the power generator means of the lock 42, 44 is constituted merely by a plurality of identical coils, e.g. 90, 92, 94, and 96 conventionally connected in a ring and mounted in a tube of high magnetic permeability, e.g. having a soft iron case 98, and also serving to provide magnetic separation between the coils, the first two coils 90 and 92 being wound in one direction (represented by crosses) while the two immediately following coils 94 and 96 are wound in the opposite direction (with each of their windings being represented by a dot in a circle). A first electrical contact 100 for providing the power link is taken between a first link point between the first and fourth coils 90 & 96 and a second link point is taken between the second and third coils 92 & 94; and a second electrical contact 102 is taken to provide the communications link from a third link point between the first and second coils 90 & 92 and from a fourth link point between the third and fourth coils 94 & 96. The coils 90, 92, 94, and 96 are designed to co-operate with a magnetic core outside the cylinder so as to form a magnetic circuit whose magnetic flux is reversed cyclically, thereby making it possible to induce alternating current at the electrical contacts 100 and 102. In similar manner to the above-described piezoelectric structure, it can be seen that this magnetic structure is likewise reversible and that causing electricity to flow in the coil by means of the electrical contact terminals will generate magnetic flux that can be used for releasing a tongue-locking element, thereby causing the lock to be released.

The power generator means 14 of the key is identical in structure, in particular with respect to size, having four coils 110, 112, 114, and 116 likewise connected in a ring and mounted in a soft iron case 118 (the body of the key) and similarly having magnetic separator walls between the coils whose winding directions and connections are similar to those described above. First and second electrical contacts 120 and 122 are similarly provided for the power link and the communications link. Nevertheless, the means 14 of the key further include, at one end of the shank 124 of said key, four bipolar annular magnets 130, 132, 134, and 136 placed side by side and separated by washers 138, 140, 142, and 144 of soft iron forming magnetic separation walls, with the polarities of the magnets being chosen so that two adjacent magnets repel each other (the north/south axes of these magnets being parallel to the axis of the shank 124). The annular magnets are of a size that accurately matches the size of the surrounding cases 98, 118 so that the separation walls between the magnets coincide exactly with the separation walls between the coils of the cases, thus providing four closed magnetic boxes each containing one magnet and one coil, as it were. The magnets and the washers are mounted on the shank 124 by means of a threaded rod 146, for example, secured to the shank and on which the magnets and the washers are screwed. Furthermore, an additional soft iron washer 148 is mounted at the other end of the shank 124 at a distance from the nearest washer 144, which distance is designed so that when the key 10 is fully inserted in the cylinder 30 of the lock (and thus complete magnetic coupling is achieved), said additional washer which also forms a magnetic separation wall, coincides exactly with the outer separation wall of the case 118 of the key so as to close the magnetic circuit completely, thereby preventing any fraudulent electromagnetic action being taken and generating very powerful induced currents. Conventional shank ejection means, symbolized merely by a spring 150, enable the magnets of the sheath-forming piece of the key in which they are initially enclosed (in their rest position) to be released before they are inserted into the cylinder (in the working position) level with the soft iron case of the lock 98 (and its coils 90 to 96) with which they constitute a magnetic circuit.

Once closed in this way, the magnetic circuit constituted by the coils of the key, the coils of the cylinder, and the magnetized shank of the key forms a lossless coupled transformer having its own resonant frequency. Codes can then be interchanged by inductive coupling at high frequency without making use of any direct electrical contact, by using conventional phase or frequency modulation.

Figure 14:
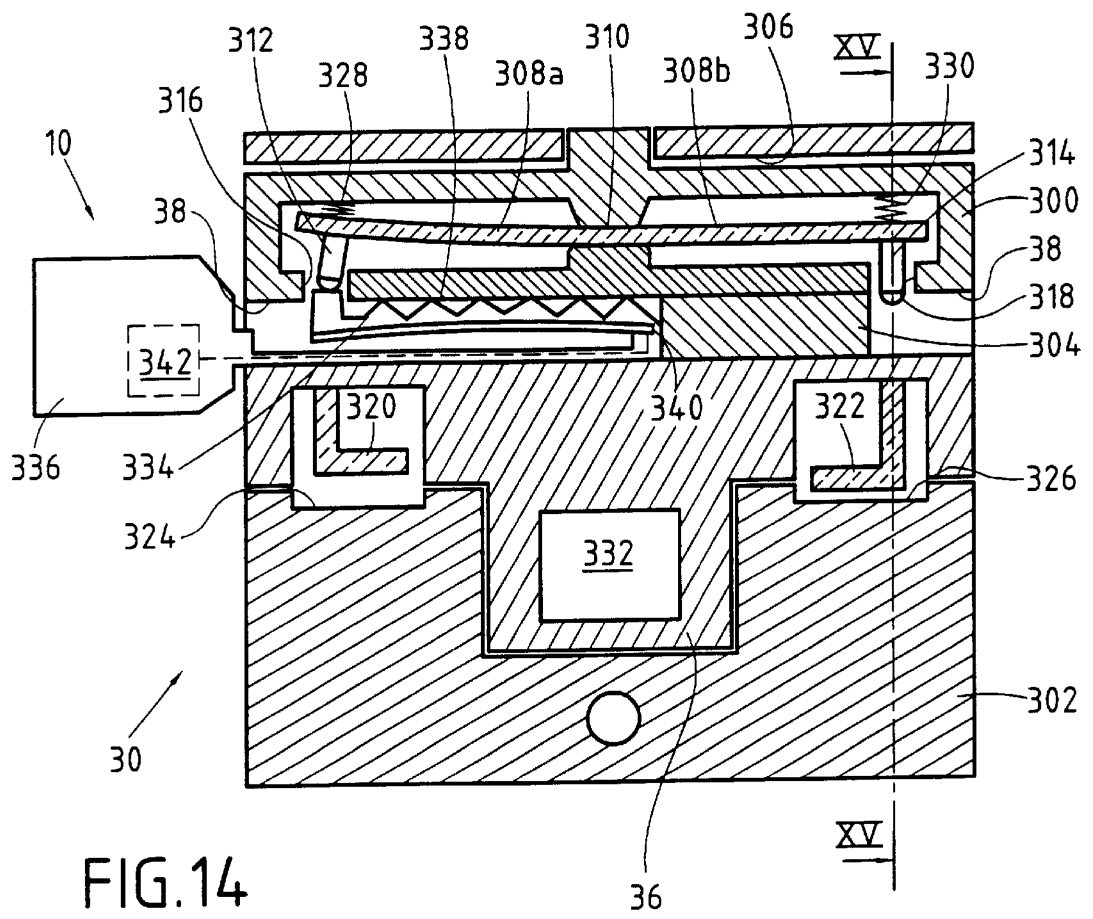
FIG. 14 is a diagrammatic longitudinal section through a first embodiment of the cylinder of FIG. 2.
Figure 15:
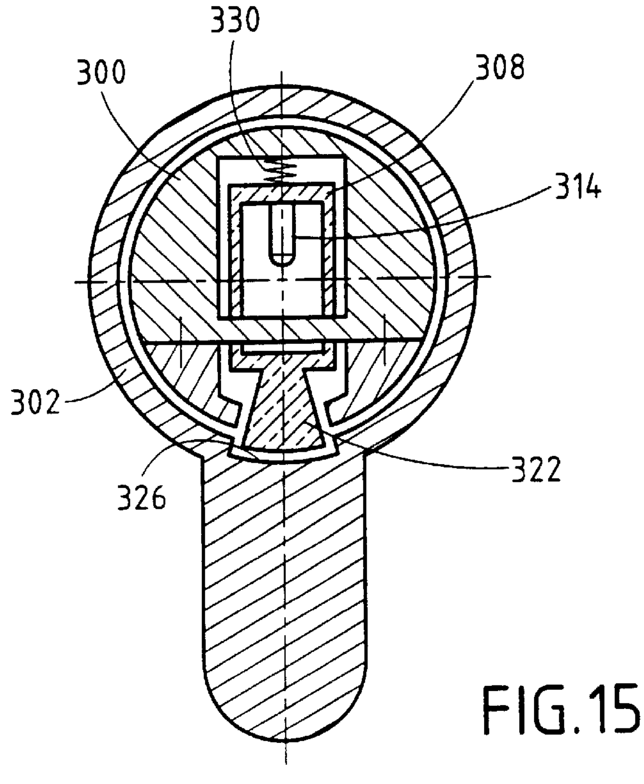
FIG. 15 is a cross-section view on plane XV—XV of FIG. 14.

FIGS. 14 and 15 show an embodiment of a dual cylinder 30 designed to receive an electronic key 10 provided with piezoelectric power generator means. The cylinder conventionally comprises a rotor element 300 secured to the tongue 36 and surrounded by a stator element 302. The housings 38 for receiving the key 10 and in which the key-expelling piston 34 can slide pass right through the rotor element.

The rotor element 300 has a cavity 306 for receiving a piezoelectric element formed by a single plate 308 passing longitudinally through the cylinder 30 over substantially its entire length and secured in its center 310 to said rotor element. The bimorph thus constituted by an upstream portion 308*a* and a downstream portion 308*b* joined by a neutral central zone (i.e. a zone that is inactive from the piezoelectric point of view), has at each of its ends firstly a contact tip 312, 314 which passes in a rest position (i.e. when not excited) through a corresponding opening 316, 318 leading to the cavity 306 of the housing 38 perpendicularly to the longitudinal axis of the cylinder, and secondly a blocking element forming a trihedral pin 320, 322 which, in the above-specified rest position, secures the rotor element 300 to the stator element 302 by being inserted in an opening 324, 326 of the stator element, and thus prevents any rotation of the tongue. Optionally, bending of the upstream or downstream portion of the piezoelectric plate 308 when the key 10 is inserted into the housing 38 can take place against resilient means, e.g. a spring 328, 330, placed at each free end of the plate 308 against its face opposite to its face receiving the contact tips 312, 314. Naturally, each of the upstream and downstream portions of the piezoelectric plate 308 has its own electrical contacts (not shown) which are connected to the electronic means of the cylinder represented diagrammatically by reference 332 and advantageously located in the tongue 36.

In the example shown in FIG. 10, the key also has a piezoelectric plate 334 which is embedded at one of its ends in the body 336 of the key and which has a space carrying a serrated profile 338, while its other face is free, such that said plate 334 is subjected to reciprocating pivoting motion about its anchor point as a result of pressure from the contact tip 312, 314 running along the serrated profile 338 while the key is being inserted into the cylinder. Like the plate 308 of the cylinder, the plate 334 of the key has electrical contacts 340 connected to the electronic means 342 of the key.

The operation of the locking system made in this way is very simple. When the key 10 is inserted into the housing 38 of the dual cylinder 30, the successive bending of the plate 334 of the key and of the front plate 308*a* of the cylinder will cause energy to accumulate in the rectifier and storage means 332, 342 both in the key and in the lock (FIGS. 1, 2; 6 and 7).

Once the key is fully inserted, the upstream blocking element 320 is released and the accumulated energy is at a maximum. The piezoelectric plates then form a coupled oscillator through which identity codes can be interchanged between the processor means 332, 342. If the codes match, the accumulated energy can be connected via the contacts of the downstream plate 308*b* which, under the effect of said energy, will bend and thus release the downstream blocking element 332 for a short instant of time, and it is only during this short instant of time that it is possible to rotate the tongue that has been released in this way. Naturally, various means (not shown) are provided to ensure that the key is not withdrawn until it has performed one complete turn (e.g. a device known as a "captive hook"). It will also be observed that the key-expelling means which is pushed back while the key is being inserted serves to guarantee that the lock is actuated by one key, and by one key only.

Figure 16:
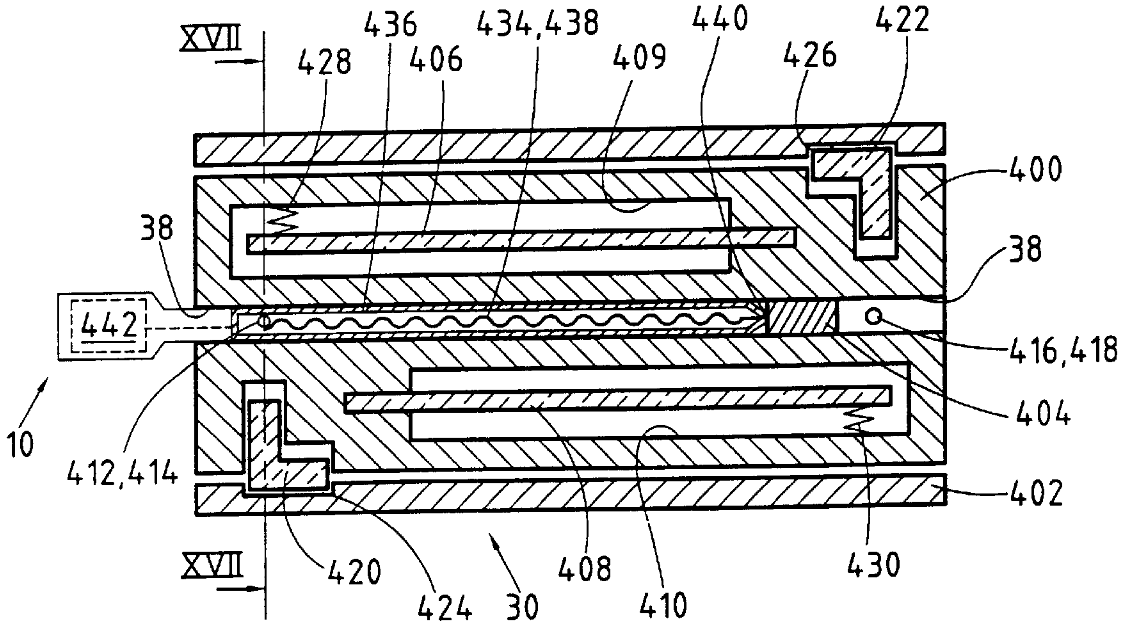
FIG. 16 is a diagrammatic longitudinal section of a second embodiment of the cylinder of FIG. 2.
Figure 17:
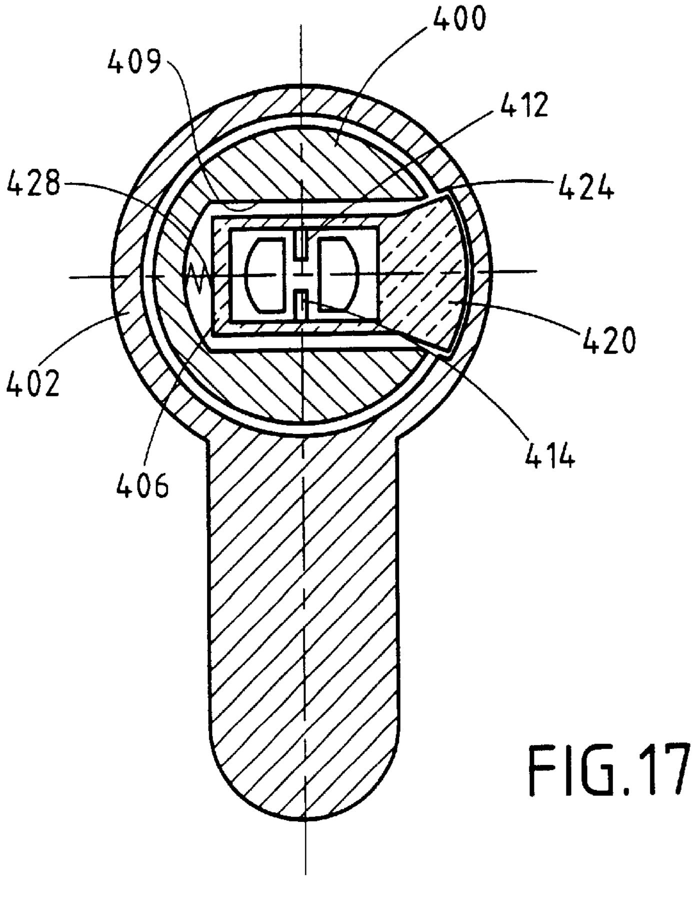
FIG. 17 is a cross-section view on plane XVII—XVII of FIG. 16.

FIGS. 16 and 17 show another embodiment of a cylinder 30 and a key 10 also provided with piezoelectric power generator means. As before this cylinder has a rotor element 400 secured to the tongue 36 and surrounded by a stator element 402. The rotor element has the housings 38 for receiving the key 10 and in which the key-expelling piston 404 can also slide passing right through.

Whereas in the embodiment of the cylinder shown in FIGS. 14 and 15, the piezoelectric element is constituted by a single piezoelectric plate having a neutral central zone, in this new embodiment, the piezoelectric element is constituted by two distinct piezoelectric plates 406, 408 disposed in two cavities 409, 410 of the rotor element 400, each extending substantially over the entire length of the cylinder. Since the energy generated by a piezoelectric element is proportional to its dimensions, it will readily be understood that this structure is advantageous since it enables the same key to recover substantially twice as much energy as in the preceding case. Each plate 406, 408 is embedded at one of its ends in the rotor element, with its other end having two opposite contact tips 412, 414; 416, 418 which, in a rest position (i.e. in the absence of excitation), open out into opposite sides of the housing 38 and also a blocking element forming a trihedal pin 420, 422 which, in the above-specified rest position, secures the rotor element 400 to the stator element 402 and is inserted in an opening 424, 426 of the stator element. The bending of one or the other of the piezoelectric plates 406, 408 on insertion of the key 10 in the housing 38 can optionally be performed against resilient means, e.g. a spring 428, 430, placed at each of the free ends of the plate 406, 408, on its face opposite from its face supporting the blocking means 420, 422. In addition, each of the piezoelectric plates has electrical contacts (not shown) which are connected to the electronic means of the cylinder (not shown).

The key 10 more particularly intended for cooperating with the type of cylinder described above is shown in FIG. 16. This key also has a piezoelectric plate 434 with a serrated profile 438 (which profile can be made simply, for example, by covering the plate in profiled resin) and has one of its ends embedded in the body 436 of the key so that when the key is inserted in the cylinder, the pressure of the opposing contact tips 412, 414; 416, 418 along the serrated profile 438 causes said plate 434 to perform reciprocating pivoting motion about its anchor point. It will be observed that in order to protect the piezoelectric plate as well as possible from any external contact other than that which it makes with the contact tips, the plate is advantageously accessible only via lateral grooves in the key. Like the plates 406 and 408 of the cylinder, the plate 434 of the key has electrical contacts 440 connected to the various electronic means of the key given a single reference 442.

This variant embodiment operates in identical manner to the preceding embodiment. It should merely be observed that in this new variant, when the codes match, the energy accumulated while the key is being inserted is now discharged via the second plate 408 and not as before via the second portion of the sole plate 308*b*. In this case also, the discharge serves to release the second blocking means 422, with the first blocking means 420 naturally being released by insertion of the key.

Figure 18:
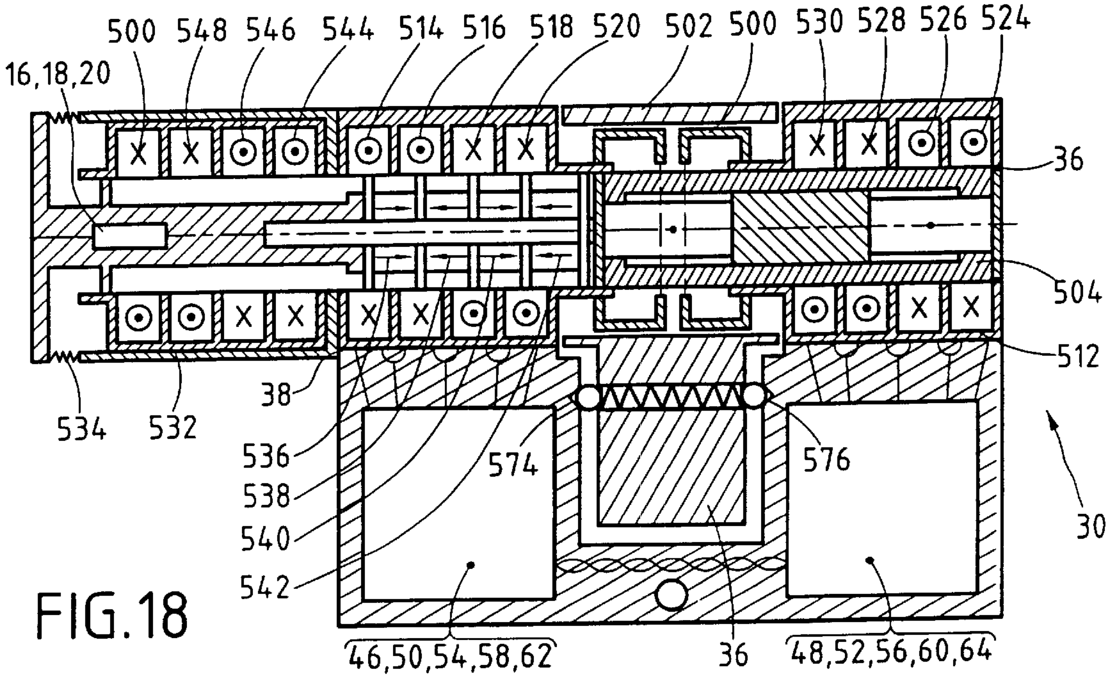
FIG. 18 is a diagrammatic longitudinal section view of another embodiment of the cylinder of FIG. 2.
Figure 19A:
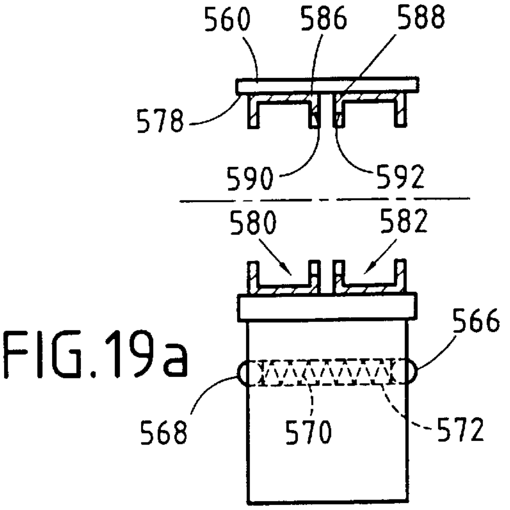
FIGS. 19*a* and 19*b* show an embodiment of the tongue of the cylinder of FIG. 18.
Figure 19B:
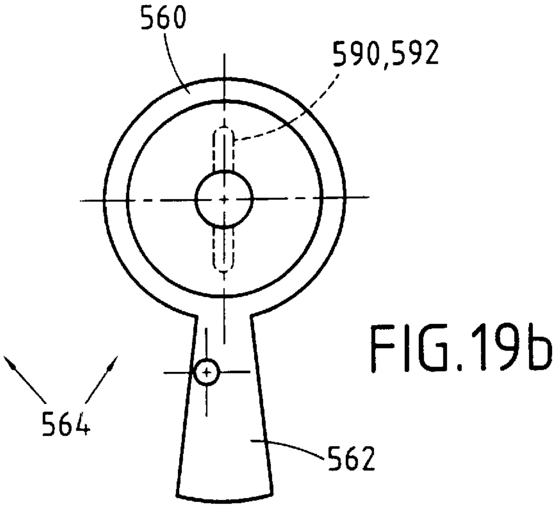
Figure 20A:
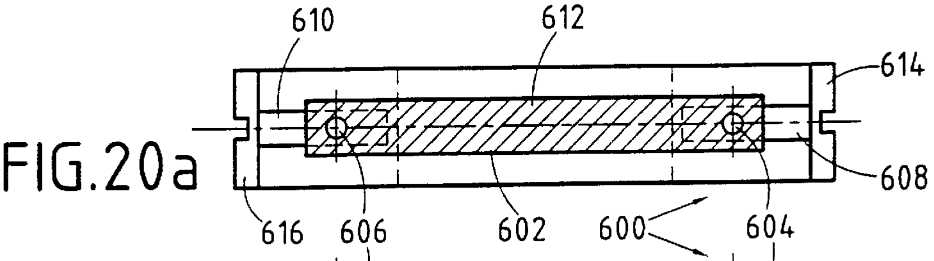
FIGS. 20*a* and 20*b* show an embodiment of the key-expelling piston of the cylinder of FIG. 18.
Figure 20B:
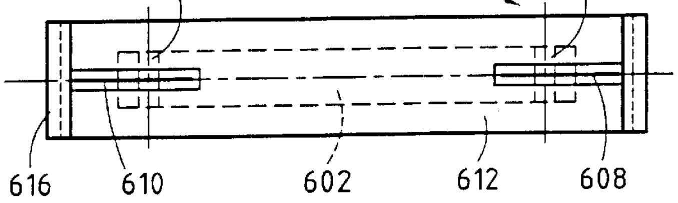

FIGS. 18 to 20 show an embodiment of a cylinder 30 and a key 10 in which the power generator means are implemented in magnetic form. This cylinder, as shown in FIG. 18, is constituted essentially by a stator element 502 surrounding a rotor element 500 which in this embodiment is constituted by no more than a single rotary tongue 36 whose various component parts are described in detail with reference to FIGS. 19*a* and 19*b*. The stator element 502 has two similar modules 506 and 508 each received at the inlet of the cylinder 30 and having housings 38 passing therethrough to receive the key 10, and in which it is also possible for a key-expelling piston 504 to slide whose structure is described in greater detail with reference to FIGS. 20*a* and 20*b*. Each module 506, 508 is constituted simply by a soft iron tube 510, 512 provided with a plurality of washers likewise made of soft iron and regularly spaced apart so as to separate four coils 514, 516, 518, and 520; 524, 526, 528, and 530 disposed in the tube around the housing 38. The windings of these coils and their interconnections are made as described above (see FIG. 13) and their links with the various electronic means 46 to 64 are likewise as described above (see FIG. 2).

An embodiment of the key for co-operating with the type of cylinder having magnetic components is also shown in FIG. 18. The key has a moving magnetized shank 532 (movable under drive from displacement means 534) comprising a soft iron body provided with four bipolar annular magnets 536, 538, 540, and 542, and forming a magnetic core for four coils 544, 546, 548, and 550.

The tongue 36 which is shown in greater detail in FIG. 19*a* (FIG. 19*b* being an end view of FIG. 19*a*) comprises a conventional external structure with a cylindrical body 560 from which a fin 562 projects radially. The fin has an orifice 564 passing therethrough in which there is placed a centering device 566, e.g. formed by a ball-and-spring assembly 568, 570, and 572 suitable for co-operating with complementary cavities 574 and 576 formed in register therewith in the stator element 502. The body 560 is also pierced by an opening 578 for receiving two hollow annular pieces of soft iron 580 and 582 placed one against the other while leaving an empty disk-shaped space 584 between them. The inside walls 586 and 588 of these annular pieces in contact with this empty space also include respective slots 590 and 592 which, in a tongue-release position, receive a slightly magnetized rotary blocking blade carried by the key-expelling piston 504.

The piston is described below with reference to FIGS. 20*a* and 20*b* which show a face view and a profile view. It comprises a body 600 that fits in the housings 38 in which it slides and that is provided with a central core 602 of soft iron with the slightly magnetized rotary blades 608, 610 being pivotally mounted about respective axes 604, 606, each blade having a portion extending beyond the central core 602 and in line therewith (in the rest position).

The assembly is covered in a non-magnetic material such as brass or resin 612 (except for the blade 608 or 610 which must be free to pivot about its respective axis 604, 606). Two soft iron mechanical interfaces 614 and 616 are placed at respective ends of the piston, thereby completing the structure thereof, these disks being adapted to receive exactly the mechanical interface means 12 of the key (for example, a blade/slot system could be entirely suitable for providing such a rotary drive link).

The operation of this embodiment of the invention is described below with reference to FIGS. 21 to 23.

Figure 21A:
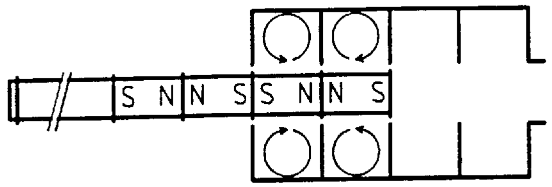
FIGS. 21*a* and 21*b* relate to the embodiment of FIG. 18 and show the interaction between the key and the cylinder for two successive positions of the key.
Figure 21B:
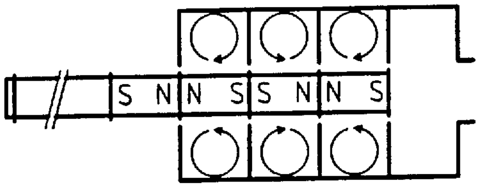

FIGS. 21*a* and 21*b* show the magnetic flux distribution in the coils of the cylinder 30 as a function of two different and successive positions of the key 10. It can be seen that shifting the key by one serration reverses the flux perceived by each coil because of the opposite polarities carried by pairs of adjacent magnets, which polarities determine the direction of the flux. Fully inserting the key will therefore generate four alternations of alternating current of amplitude that increases from alternation to alternation, with rectification thereof being performed by the rectification and storage means. A similar process takes place in the key when the magnetized shank is ejected from its sheath either prior to the key being inserted as shown in FIGS. 9 and 10 that relate to a piezoelectric version of the key, or at the moment of insertion, thereby enabling the key to have self-contained power supply and communication.

Figure 22:
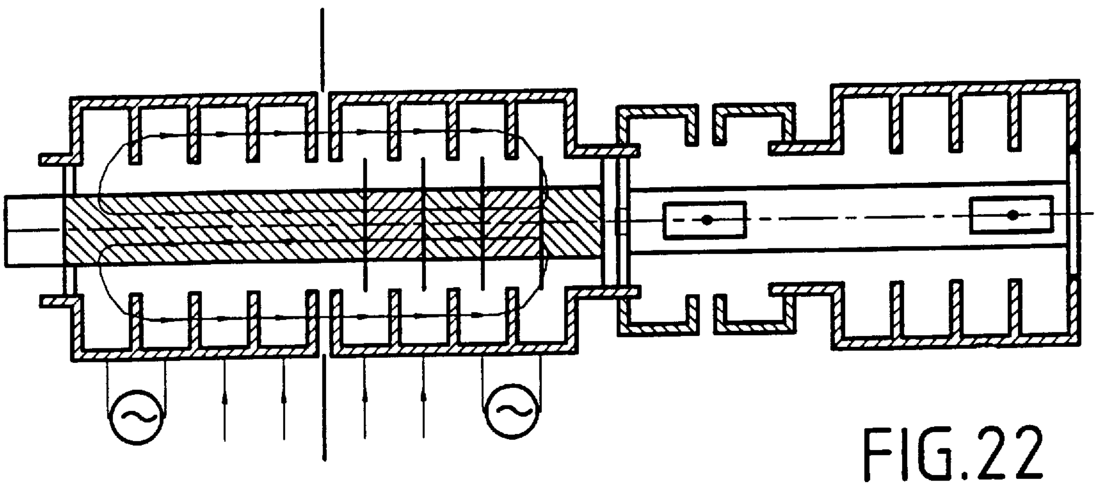
FIG. 22 is a diagram showing key-cylinder interaction after the key has been fully inserted.
Figure 23:
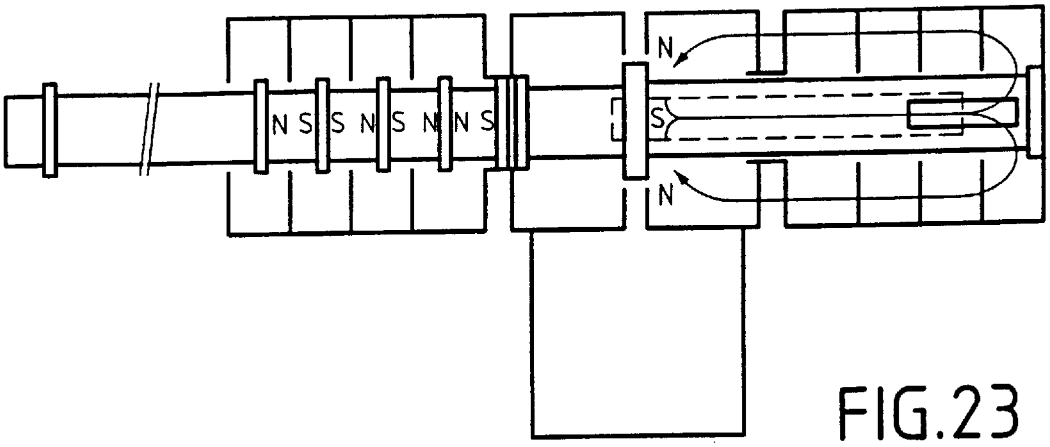
FIG. 23 is a diagram showing key-cylinder interaction when the tongue is released.

When the key is fully inserted in the cylinder of the lock (FIG. 18), a closed magnetic circuit is established including a contribution from the structure of the key, as shown in FIG. 22, with magnetic flux travelling through the coils of the key and of the lock and looping via the magnetized shank. In this configuration, the assembly forms a perfect coupled transformer whose resonant frequency can be selected as a carrier frequency for communication between the processor means of the key and the lock previously powered by the rectifier and storage means (a communications link by mere insertion can also be envisaged). After codes have been interchanged, and assuming they match, the energy accumulated during insertion of the key is discharged via the electrical contacts of the second module, thereby generating an intense magnetic field that causes the rotary blade 610 of the key-expelling piston 504 to pivot (to take up a stable vertical position), and thus, by becoming inserted in the slots of the tongue secures it to the piston, thereby enabling the assembly to be driven by the shank of the key (because of the mechanical interface means 12). After a short determined period or when the key is extracted, the lock is again prevented from operating, with the magnetized rotary blade returning to its initial horizontal position.

It will be observed that the invention, both in its magnetic version and in its piezoelectric versions makes it possible to provide a locking system that is particularly optimized in that the power generator means of the lock associated with the power generator means of the key suffice to perform the three essential functions of the system: the function of power generation is performed by a mechano-electrical connection of a deformation (piezoelectric version) or of a displacement (magnetic version) causing electrical charge to be stored in storage means, the communications function is implemented by high frequency coupling between the means of the lock and of the key, and the actuator function, given the reversibility of the means used, is implemented by electromechanical conversion of the previously stored electrical charge into a deformation or a displacement.

Naturally, the fully optimized version of the invention can also be implemented in a more limited configuration, in particular by providing for data to be communicated between the lock and the key or energy to be transferred from the key solely by means of a direct electrical contact, e.g. as shown in FIG. 10.

What is claimed is:

1. An electronic key comprising, mounted in a key body, a key shank for insertion into a corresponding housing of a lock cylinder for the purpose of unlocking it, the cylinder having a stator portion and a rotor portion secured to a tongue, and including first mechanical means and first electronic means, and the key including second mechanical means and second electronic means for cooperating with the corresponding first means of the cylinder when the key is fully inserted in the cylinder and for causing the lock to be unlocked when an identity code of the key and a corresponding code of the lock match, the key being characterized in that the electronic means of the key (16, 18, 20) are powered from self-contained power generator means (14), including at least one piezoelectric element (70; 84) designed to generate electric charge from successive bending movements generated by the displacement of the shank of the key (82), in the body of the key (80; 118).

2. An electronic key according to claim 1, characterized in that said power generator means is connected via a power link to a rectifier and storage means (16) which generates a DC power supply voltage from AC signals delivered by the power generator means (14), said rectifier and storage means (16) itself being connected to processor means (18) which, via communications link connecting it to the power generator means (14), serves to interchange the data required for unlocking the cylinder.

3. An electronic key according to claim 2, characterized in that the power link and the communications link constitute a single link at the power generator means (14), and in that the second electronic means then include multiplexer/demultiplexer means (66) for connecting the power generator means (14) both to the rectifier and storage means (16) and to the processor means (18).

4. An electronic key according to claim 2, characterized in that the second electronic means further include communications interface means (20) disposed between the processor means (14) and the power generator means (14) for matching and filtering the signals delivered at the output of the processor means.

5. An electronic key according to claim 1, characterized in that said at least one piezoelectric element is constituted by a single piezoelectric plate (70; 33, 434; 84) embedded at one of its two ends in the body of the key (10; 336; 436; 80).

6. An electronic key according to claim 5, characterized in that said piezoelectric plate has a serrated profile **(70*b*; 338, 438) designed to co-operate with at least one contact tip (68*b*; 312, 314; 412, 414) of a piezoelectric element of the cylinder (68)** while the key is being inserted into the cylinder.

7. An electronic key according to claim 5, characterized in that the end of said piezoelectric plate that is left free has a contact tip **(84*a*) designed to co-operate with a serrated profile (82*a*) of the key shank (82)** during extraction/retraction of the shank out from or into the body of the key.

8. An electronic key according to claim 7, characterized in that the key shank (82) also has an additional piezoelectric element (70) connected to the processor means (18) and designed to interchange data between the key and the cylinder of the lock after the key shank has been inserted in the cylinder.

9. An electronic key according to claim 7, characterized in that the key shank (82) further includes at least one contact area **(82*b*) connected to the processor means (18)** and designed to interchange data between the key and the cylinder of the lock after the key shank has been inserted in the cylinder.

10. An electronic key according to claim 9, characterized in that said at least one contact area is also connected to rectifier and storage means (16) to enable the cylinder to be powered form the lock after the key shank has been inserted in the cylinder.

11. An electronic key according to claim 9, characterized in that said key shank is of cruciform shape (86).

12. A lock designed to be operated by means of an electronic key according to claim 1, the lock being characterized in that the cylinder (30) has at least one power generator means (42, 44) that is actuated during or at the end of insertion of the key so as to power the first electronic means of the cylinder (46–64; 51).

13. A lock according to claim 12, characterized in that said power generator means also serve to provide coupling between the key and the cylinder of the lock, to enable data, in particular identity codes, to be interchanged between the cylinder and the key after the shank of the key has been inserted in the cylinder.

14. A lock according to claim 12, characterized in that said power generator means also makes it possible to cause an element for blocking the tongue (36) to be displaced so as to unlock the lock.

15. A lock according to claim 14, characterized in that said power generator means is connected via a power link to rectifier and storage means (46, 48) which generate a DC power supply voltage from alternating signals delivered by the power generator means (42, 44), said rectifier and storage means itself being connected to processor means (50, 52) which, via a communications link connecting it to the power generator means (42, 44), serves to interchange data required for unlocking the cylinder of the lock, said processor means also serving to drive control means (58, 60) which deliver a control pulse to the power generator means (42, 44) via the communications link, said pulse being of determined duration that is sufficient to release the element for blocking the tongue (36), thereby unlocking the lock.

16. A lock according to claim 15, characterized in that the first electronic means of the cylinder further include switching means (62, 64) enabling the power generator means (42, 44) to be connected via its communications link both to the processor means (50, 52) and to the control means (58, 60).

17. A lock for operating by means of an electronic key according to anyone claim 6, characterized in that said power generator means of the cylinder comprise at least one piezoelectric element (68) having electrical contact terminals **(68*a*) with successive bending movements thereof during insertion of the key (10)** generating electric charge at the contact terminals thereof.

18. A lock according to claim 17, characterized in that said piezoelectric element is constituted by a single piezoelectric plate (68; 406, 408) embedded at one of its two ends in the rotor portion of the cylinder (400).

19. A lock according to claim 17, characterized in that said piezoelectric element is constituted by a bimorph (308) whose central portion (310) is embedded in the rotor portion of the cylinder (300).

20. A lock according to claim 18, characterized in that each free end of the piezoelectric element (68; 308, 406, 408) has at least one contact tip **(68*b*; 312, 314; 412, 414, 416, 418) designed to cooperate with the shank of the key and at least one blocking element (320, 322; 420, 422) designed, in a rest position, to prevent any rotation of the tongue (36) relative to the stator portion of the cylinder (302, 402)**.

21. An electronic locking system of the piezoelectric type comprising an electronic key according to claim 6 and a lock provided with a cylinder according to any one of claims 17 to 20.

* * * * *